United States Patent
Bandholz et al.

(10) Patent No.: US 8,799,570 B2
(45) Date of Patent: Aug. 5, 2014

(54) IMPLEMENTING A REDUNDANT ARRAY OF INEXPENSIVE DRIVES

(75) Inventors: Justin P. Bandholz, Cary, NC (US); Kevin M. Reinberg, Chapel Hill, NC (US); Philip L. Weinstein, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 1928 days.

(21) Appl. No.: 11/768,551

(22) Filed: Jun. 26, 2007

(65) Prior Publication Data

US 2009/0006737 A1   Jan. 1, 2009

(51) Int. Cl.
*G06F 13/00* (2006.01)
*G06F 13/28* (2006.01)

(52) U.S. Cl.
USPC .................. 711/114; 711/112; 711/E12.103

(58) Field of Classification Search
None
See application file for complete search history.

(56) References Cited

U.S. PATENT DOCUMENTS

| 7,010,657 | B2 | 3/2006 | Lowe et al. | |
|---|---|---|---|---|
| 7,139,809 | B2 | 11/2006 | Husain et al. | |
| 2004/0111559 | A1* | 6/2004 | Heil | 711/114 |
| 2006/0136688 | A1 | 6/2006 | Pang et al. | |
| 2006/0195624 | A1 | 8/2006 | Chikusa et al. | |
| 2008/0028238 | A1* | 1/2008 | Lucas et al. | 713/300 |
| 2008/0040462 | A1* | 2/2008 | Islam et al. | 709/222 |
| 2009/0157958 | A1* | 6/2009 | Maroney et al. | 711/114 |

* cited by examiner

*Primary Examiner* — Eric S Cardwell
(74) *Attorney, Agent, or Firm* — Brandon C. Kennedy; Katherine S. Brown; Biggers Kennedy Lenart Spraggins LLP

(57) ABSTRACT

Methods, apparatus, and products are disclosed for implementing a redundant array of inexpensive drives ('RAID') with an external RAID controller and hard disk drives from separate computers, including configuring by the external RAID controller a RAID array, the RAID array comprising hard disk drives from the separate computers, the external RAID controller comprising a hardware RAID controller installed externally with respect to the separate computers, and storing, by one or more of the separate computers through the external RAID controller, computer data on the RAID array.

18 Claims, 4 Drawing Sheets

IMPLEMENTING A REDUNDANT ARRAY OF INEXPENSIVE DRIVES

BACKGROUND OF THE INVENTION

1. Field of the Invention

The field of the invention is data processing, or, more specifically, methods, apparatus, and products for implementing a RAID array.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

One of the areas in which progress has been made is in non-volatile computer memory such as hard disk drives. A single internal hard disk drive, however, lacks redundancy. To gain redundancy, either more drives need to be added to the system, which requires more space and power, or external drives may be connected for redundancy, RAID arrays, SAN arrays, and so on. Another mechanism to gain similar functionality is to use a Cluster File System such as GFS. However, nodes that participate in a CFS are unable to boot from the file system or operate independently of system status, since it exists at the operating system level.

SUMMARY OF THE INVENTION

Methods, apparatus, and products are disclosed for implementing a redundant array of inexpensive drives ('RAID') with an external RAID controller and hard disk drives from separate computers, including configuring by the external RAID controller a RAID array, the RAID array comprising hard disk drives from the separate computers, the external RAID controller comprising a hardware RAID controller installed externally with respect to the separate computers, and storing, by one or more of the separate computers through the external RAID controller, computer data on the RAID array.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
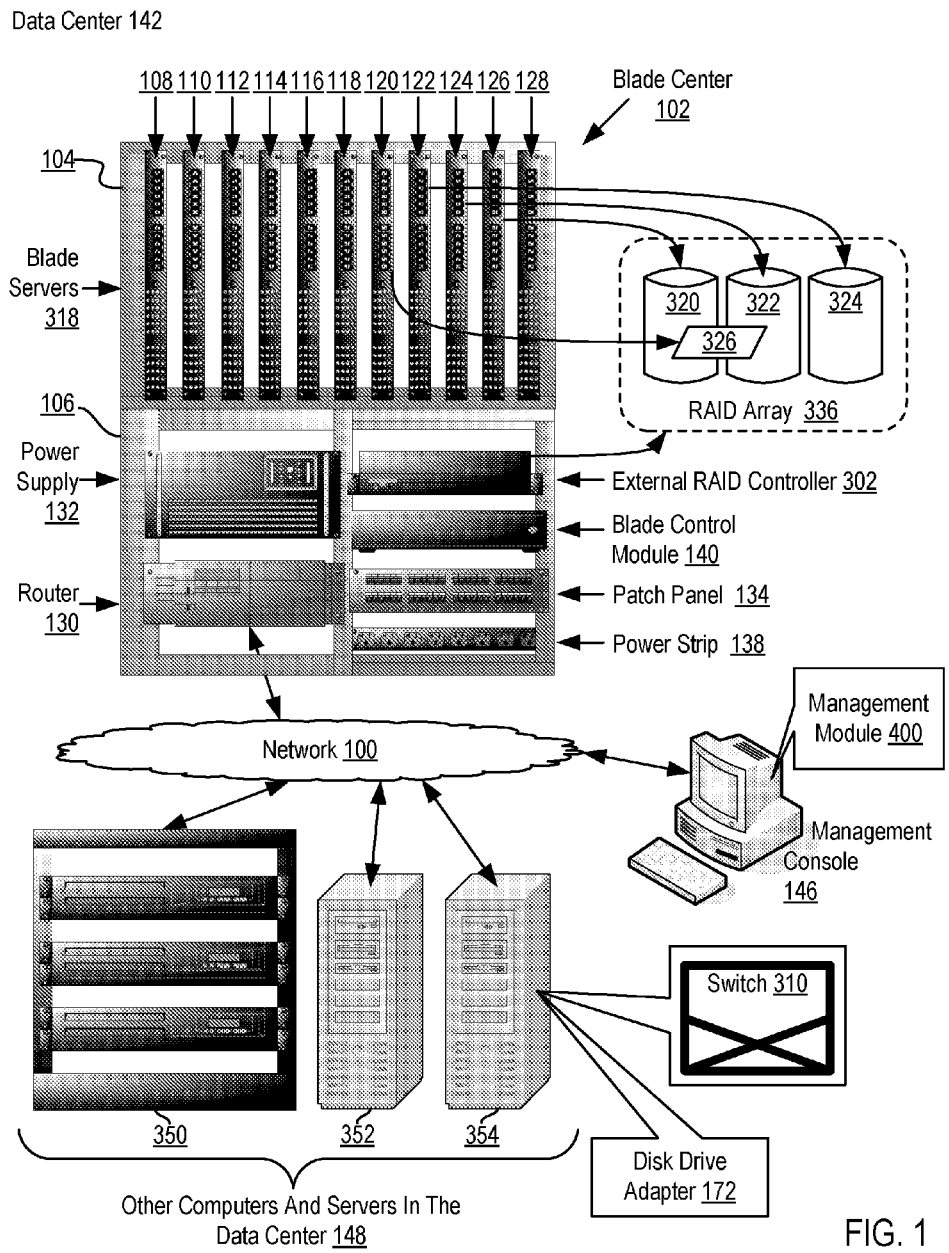
FIG. 1 sets forth a line drawing illustrating an exemplary system of computers in a data center that is configured for implementing a RAID array according to embodiments of the present invention.

Exemplary methods, systems, and products for implementing a RAID array according to embodiments of the present invention are described with reference to the accompanying drawings, beginning with FIG. 1. FIG. 1 sets forth a line drawing illustrating an exemplary system of computers in a data center (142) that is configured for implementing a RAID array according to embodiments of the present invention. The data center (142) is a facility that houses computers (108-128, 148) and equipment (302, 130, 140, 336, 144) supporting computer operations.

The system of FIG. 1 includes a blade center (102), which contains computers in the form of blade servers as well as equipment supporting computer operations in the data center. The blade center (102) of FIG. 1 includes eleven blade servers (108-128), servers implemented in a blade form factor and installed in a cabinet bay (104) of the blade center (102). The exemplary blade center (102) of FIG. 1 includes a blade control module (104). The blade control module (140) of FIG. 1 is a hot-swappable device that can be accessed through a management console (146) and used by a system administrator to configure and manage all components installed in the blade center (102). The blade servers (108-128) are coupled through the blade control module (140), the router (130), and the network (100) for data communications with the management console (146). The management console can read status information and control processes on the blade servers (108-128) by use of data communications through the network (100), the router (130), and the blade control module (140).

In the exemplary blade center (102) of FIG. 1 the cabinet bay (106) includes, in addition to the blade control module (140), a power supply (132) that provides power to all components of the blade center (102), a data communications network router (130), a patch panel (134), a Redundant Array of Independent Disks ('RAID') (336), and a power strip (138). The power supply (132) may be intelligent or programmable; it may be, for example, a Power Distribution Unit ('PDU') or an Uninterruptible Power Supply ('UPS').

Computers and equipment of the data center are connected for data communications through network (100). The network (100) may be a local area network ('LAN'), a wide area network ('WAN'), a storage area network ('SAN'), a Fibre Channel network, an Infiniband network, and any combination of these different kinds of networks, as well as any other network as may occur to those of skill in the art. The computers and equipment in the data center also include several other computers and servers (148). The other computers and servers (148) include a couple of separate servers (352, 354) and several rack mounted computers or rack mounted servers such as 1 Us, 2 Us, 3 Us, 4 Us, 5 Us, or 6 Us (350).

The management console (146) in the example data center of FIG. 1 includes a management module (400). In this example, the management console (146) is implemented as a general purpose computer or workstation, and the management module (400) is implemented as a module of computer program instructions installed and running in random access memory and on a computer processor of the management console. This implementation of the management module running in random access memory and on a computer processor in a generally programmable computer is not a limitation of the present invention. A management module for implementing a RAID array according to embodiments of the present invention may be implemented as firmware, as hardware, in a programmable logic device such as a programmable logic array ('PLA'), a complex programmable logic device ('CPLD'), or a field programmable gate array ('FPGA'), as well as in other ways that will occur to those of skill in the art, and all such ways are well within the scope of the present invention.

In the example of FIG. 1, the external RAID controller (302) is 'external' in that it is a hardware RAID controller that is installed externally with respect to the separate computers in the system of FIG. 1. The separate computers (108-126, 148) are 'separate' in that they are each installed in individual cabinetry that is separate from one another and separate from the cabinet of the external RAID controller (302). The system of FIG. 1 operates generally to implement a redundant array of inexpensive drives according to embodiments of the present invention by configuring by the external RAID controller (302) a RAID array (336) and storing, by one or more of the separate computers through the external RAID controller, computer data (326) on the RAID array. The RAID array includes hard disk drives (320, 322, 324) from the separate computers. That is, the external RAID controller configures a RAID array using hard disk drives actually installed and operating internally within the separate computers (108-128, 148). This example show three disk drives (320, 322, 324) from three of the separate computers (122, 124, 126) configured as a RAID array (336), although readers will recognize that the RAID array can be composed of hard disk drives from any of the separate computers and any number of hard disk drives consistent with the RAID specifications, RAID 0, RAID 1, RAID 2, and so on. This example shows only one (120) of the separate computers storing computer data (326) on the RAID array (336), but readers will recognize that any or all of the separate computers, connected as they are to the external RAID controller (302) through the network (100), can store computer data on the RAID array.

In addition, any or all of the separate computers can be configured to have both the capability of contributing their hard disk drives to a RAID array and the capability of retaining use of their hard disk drives for separate use by a separate computer. Any or all of the separate computers can include a switch (310) having two switch states:

a first switch state in which the switch connects a host disk drive adapter (172) in a separate computer through the switch only to the hard disk drive in a separate computer; and
  a second switch state in which the switch connects the host disk drive adapter (172) in the separate computer through the switch only to the external RAID controller (302).

The host disk drive adapter can be any disk drive adapter as will occur to those of skill in the art, including, for example, an Advanced Technology Attachment ('ATA') adapter, a Serial ATA ('SATA') adapter, a Small Computer System Interface ('SCSI') adapter, or a Serial Attached SCSI ('SAS') adapter. The switch can be any switch as will occur to those of skill in the art, including, for example, an SAS switch.

A separate computer that contributes its hard disk drive to a RAID array according to embodiments of the present invention may include all its operating components, except for the its disk drive adapter, hard disk drive, and switch, in a first power domain, and its host disk drive adapter, hard disk drive, and switch in a second power domain. That is, the host disk drive adapter, hard disk drive, and switch can be in a power domain that is separate from the power domain of all the other components of such a separate computer—enabling the separate computer to be powered down without affecting the operation of the RAID array.

The arrangement of blade servers, power supply, RAID array, power strip, and other computers making up the exemplary system of FIG. 1, as well as the network, the management console, and the other devices illustrated in FIG. 1, is for explanation, not for limitation of the present invention. Computers and other equipment for implementing a RAID array according to embodiments of the present invention may include additional computers, servers, or other devices, not shown in FIG. 1, as will occur to those of skill in the art. Networks in such data centers may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Implementing a RAID array in accordance with the present invention is generally implemented with computers, that is, with automated computing machinery. For further explanation, therefore, FIG. 2 sets forth a block diagram of automated computing machinery comprising an exemplary blade server (424) configured for intrusion protection for a blade server according to embodiments of the present invention. The blade server (424) of FIG. 2 includes at least one computer processor (156) or 'CPU' as well as random access memory (168) ('RAM') which is connected through a system bus (162) to processor (156) and to other components of the computer.

Figure 2:
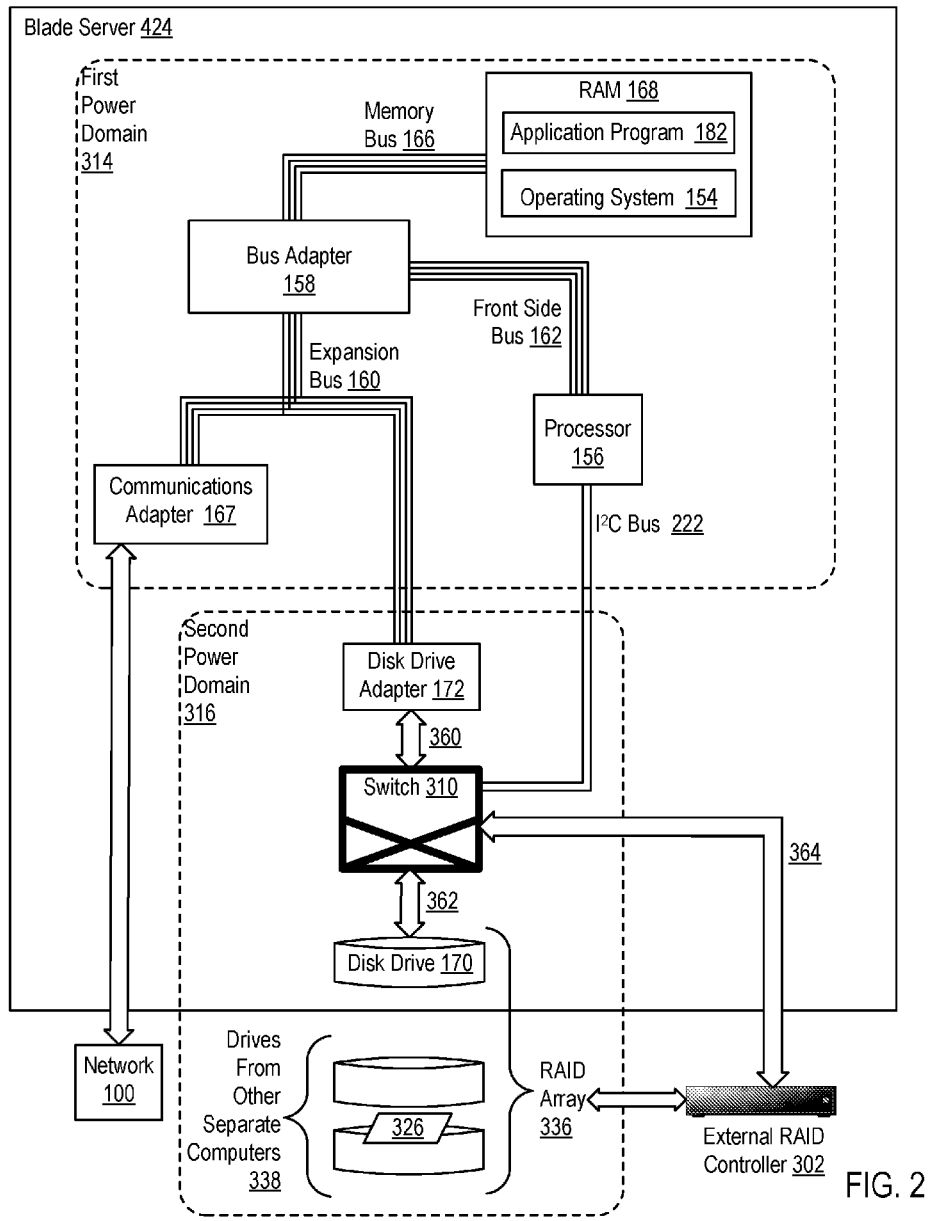
FIG. 2 sets forth a block diagram of automated computing machinery comprising an exemplary computer useful in implementing a RAID array according to embodiments of the present invention.

Stored in RAM (168) in the example of FIG. 2, are a blade server application program (182) and an operating system (154). The blade server application is a module of computer program instructions that carries out user-level tasks in response to requests from client devices. Operating systems useful in computers according to embodiments of the present invention include UNIX™, Linux™, Microsoft XP™, Microsoft Vista™, AIX™, IBM's i5/OS™, and others as will occur to those of skill in the art. The operating system (154) and the blade server application program (182) in the example of FIG. 2 are shown in RAM (168), but many components of such software typically are stored in non-volatile memory also, for example, on a disk drive (170) or a RAID array (336).

The blade server (424) of FIG. 2 includes a bus adapter (158), a computer hardware component that contains drive electronics for the high speed buses, the front side bus (162), the video bus (164), and the memory bus (166), as well as drive electronics for the slower expansion bus (160). Examples of bus adapters useful in computers according to embodiments of the present invention include the Intel Northbridge, the Intel Memory Controller Hub, the Intel Southbridge, and the Intel I/O Controller Hub. Examples of expansion buses useful in computers according to embodiments of the present invention include Industry Standard Architecture ('ISA') buses and Peripheral Component Interconnect ('PCI') buses.

The blade server (424) of FIG. 2 includes disk drive adapter (172) coupled through expansion bus (160) and bus adapter (158) to processor (156) and other components of the blade server (424). Disk drive adapter (172) connects non-volatile data storage to the blade server (424) in the form of disk drive (170). Disk drive adapters useful in computers include Integrated Drive Electronics ('IDE') adapters, Small Computer System Interface ('SCSI') adapters, and others as will occur to those of skill in the art. In addition, non-volatile computer memory may be implemented for a computer as an optical disk drive, electrically erasable programmable read-only memory (so-called 'EEPROM' or 'Flash' memory), RAM drives, and so on, as will occur to those of skill in the art.

The exemplary blade server (424) of FIG. 2 includes a communications adapter (167) for implementing data communications with a remote desktop apparatus (434). Such data communications may be carried out serially through RS-232 connections, through external buses such as USB, through data communications networks such as Ethernet Internet Protocol ('IP') networks, and in other ways as will occur to those of skill in the art. Communications adapters implement the hardware level of data communications through which one computer sends data communications to another computer, directly or through a network. Examples of communications adapters useful for intrusion protection for a blade server according to embodiments of the present invention include modems for wired dial-up communications, Ethernet (IEEE 802.3) adapters for wired network communications, and 802.11b adapters for wireless network communications.

The blade server (424) of FIG. 2 is connected to an external RAID controller (302) that implements a RAID array (336) composed of internal disk drive (170) from the blade server (424) as well as hard disk drives (338) from other separate computers. In the example of FIG. 2, the external RAID controller (302) is 'external' in that it is a hardware RAID controller that is installed externally with respect to the separate computer represented by the blade server (424) in the example of FIG. 2. The blade server (424) is a 'separate' computer in that it is installed in individual cabinetry that is separate from other servers and computers and separate from the cabinet of the external RAID controller (302). The blade server (424) and the external RAID controller (302) of FIG. 2 operate generally to implement a redundant array of inexpensive drives according to embodiments of the present invention by configuring by the external RAID controller (302) a RAID array (336) and storing, by one or more separate computers through the external RAID controller, computer data (326) on the RAID array. The RAID array includes hard disk drives (170) from blade server (424) as well as hard disk drives from other separate computers (338). That is, the external RAID controller (302) configures a RAID array using a hard disk drive (170) actually installed and operating internally within the blade server (424) of FIG. 2 as well as hard disk drives (338) actually installed and operating internally within other separate computers (such as 108-128, 148 on FIG. 1). This example shows three disk drives from the blade server (170) and from other separate computers (338) configured as a RAID array (336), although readers will recognize that the RAID array can be composed of hard disk drives from any of the separate computers and any number of hard disk drives consistent with the RAID specifications, RAID 0, RAID 1, RAID 2, and so on.

The blade server (424) in the example of FIG. 2 is configured to have both the capability of contributing its hard disk drive (170) to a RAID array and the capability of retaining use of its hard disk drive for separate use by the blade server. The blade server includes a switch (310) having two switch states:
  a first switch state in which the switch (310) connects (360, 362) a host disk drive adapter (172) in the blade server (424) through the switch (310) only to the hard disk drive (170) in the blade server (424); and
  a second switch state in which the switch (310) connects (360, 364) the host disk drive adapter (172) in the blade server (424) through the switch (310) only to the external RAID controller (302).

The host disk drive adapter can be any disk drive adapter as will occur to those of skill in the art, including, for example, an Advanced Technology Attachment ('ATA') adapter, a Serial ATA ('SATA') adapter, a Small Computer System Interface ('SCSI') adapter, or a Serial Attached SCSI ('SAS') adapter. The switch can be any switch as will occur to those of skill in the art, including, for example, an SAS switch. The processor (156) in this example controls the switch (310) through Inter-Integrated Circuit ('I$^2$C') bus ('222'). The interconnections (360, 362, 364) among the host disk drive adapter (172), the switch (310), the internal disk drive (170), and the RAID controller (302) can be of any type as will occur to those of skill in the art, including, for example, ATA connections, SATA connections, SCSI connections, SAS connections, Internet SCSI ('iSCSI') connections, SAN connections, Fibre Channel connections, and Infiniband connections.

The blade server (424) includes all its operating components (156, 158, 167, 168), except for the its disk drive adapter (172), hard disk drive (170), and switch (360), in a first power domain (314), and its host disk drive adapter (172), hard disk drive (170), and switch (310) in a second power domain (316). That is, the host disk drive adapter (172), hard disk drive (170), and switch (310) are in a power domain (316), along with the hard disk drives from other separate computers (338), that is separate from the power domain (314) of all the other components of the blade server—enabling the blade server (424) effectively to be powered down without affecting the operation of the RAID array (336).

Figure 3:
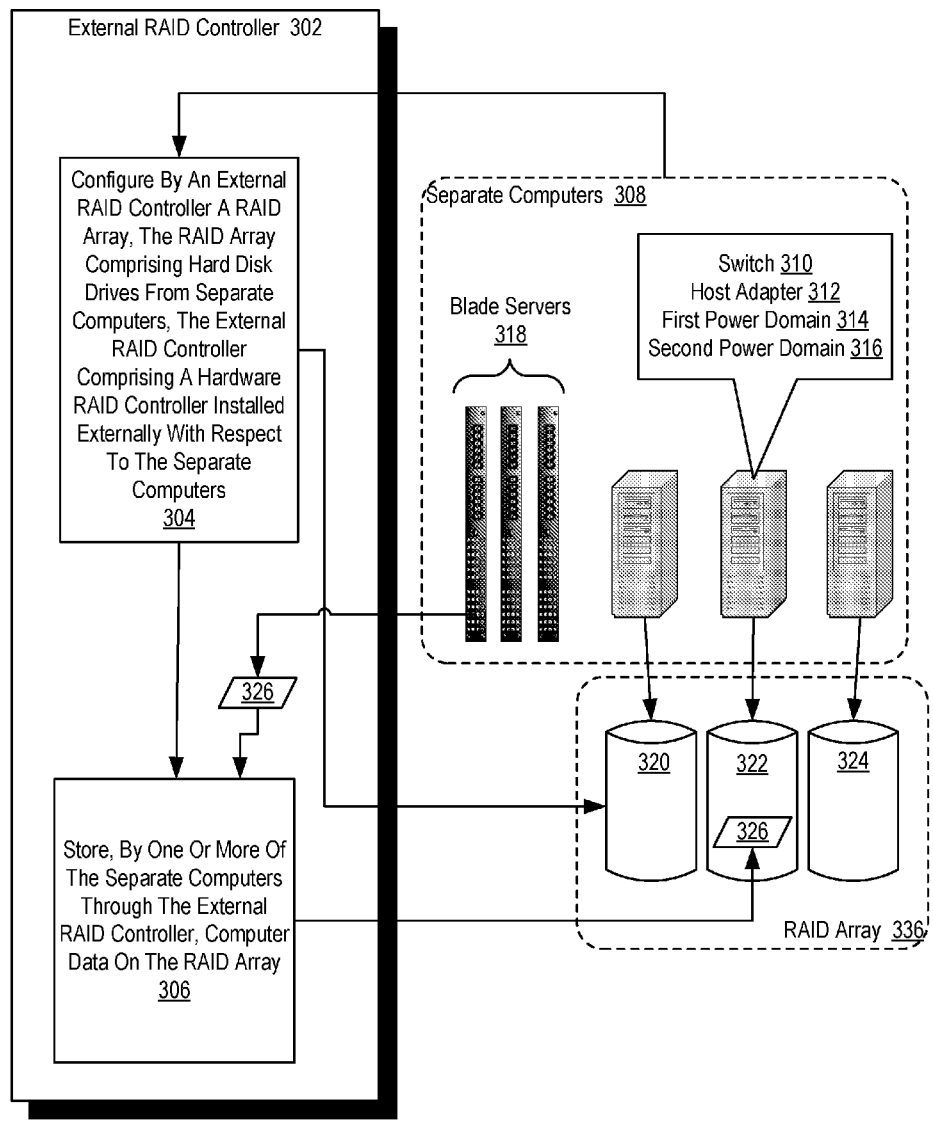
FIG. 3 sets forth a flow chart illustrating an exemplary method for implementing a RAID array according to embodiments of the present invention.

For further explanation, FIG. 3 sets forth a flow chart illustrating an exemplary method for implementing a redundant array of inexpensive drives ('RAID') according to embodiments of the present invention. The method is implemented with an external RAID controller (302) and with hard disk drives (320, 322, 324) from separate computers (308). The external RAID controller (302) is 'external' in the sense that it is a hardware RAID controller installed externally with respect to the separate computers (308). The method of FIG. 3 includes the external RAID controller's configuring (304) the RAID array (336) with hard disk drives (320, 322, 324) from the separate computers (308). The method of FIG. 3 also includes storing (306), by one or more of the separate computers (308) through the external RAID controller (302), computer data (326) on the RAID array (336).

In the method of FIG. 3, any or all of the separate computers (308) may include a switch (310) having two switch states, the switch states including:
  a first switch state in which the switch (310) connects a host disk drive adapter (312) in the separate computer through the switch only to the hard disk drive in the separate computer; and
  a second switch state in which the switch (310) connects the host disk drive adapter (312) in the separate computer through the switch only to the external RAID controller (302).

The host disk drive adapter (312) may be a Serial Attached Small Computer System Interface ('SAS') adapter and the switch (310) may be an SAS switch. The separate computers (308) may include blade servers (318). The separate computer, except for its disk drive adapter, hard disk drive, and switch, may be included in a first power domain (314), and its host disk drive adapter, hard disk drive, and switch may be included in a second power domain (316).

Figure 4:
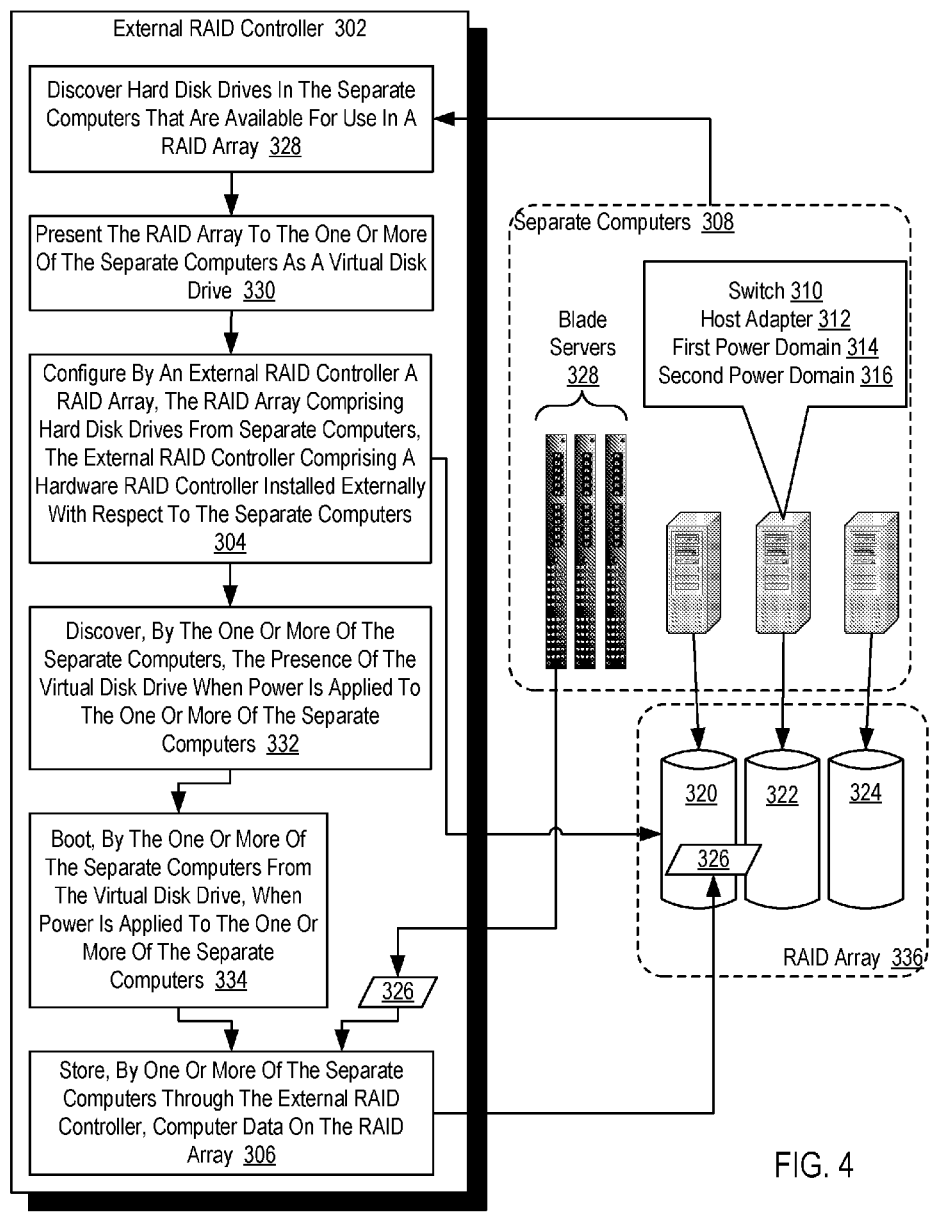
FIG. 4 sets forth a flow chart illustrating a further exemplary method for implementing a RAID array according to embodiments of the present invention.

For further explanation, FIG. 4 sets forth a flow chart illustrating a further exemplary method for implementing a RAID array according to embodiments of the present invention. The method of FIG. 4 is similar to the method of FIG. 3, implemented with an external RAID controller (302) and with hard disk drives (320, 322, 324) from separate computers (308), and including as it does the external RAID controller's configuring (304) the RAID array (336) with hard disk drives (320, 322, 324) from the separate computers (308) and storing (306), by one or more of the separate computers (308) through the external RAID controller (302), computer data (326) on the RAID array (336).

The method of FIG. 4, however, also includes discovering (328) by the RAID controller (302) hard disk drives (320, 322, 324) in the separate computers (306) that are available for use in a RAID array. The RAID controller can discover available hard disk drives by polling the separate computers, by reading the availability from a preconfigured registry, and in other ways as will occur to those of skill in the art.

The method of FIG. 4 also includes presenting (330) the RAID array to the one or more of the separate computers as a virtual disk drive. The virtual disk drive (not shown) is the interface presented by the external RAID controller for use by host disk drive adapters in the separate computers for reading and writing data from and to the RAID array. The virtual disk drive can present any disk drive interface as will occur to those of skill in the art, including, for example, an ATA interface, a SATA interface, a SCSI interface, an SAS interface, an iSCSI interface, a SAN interface, a Fibre Channel interface, and an Infiniband interface.

The method of FIG. 4 also includes discovering (332), by the one or more of the separate computers, the presence of the virtual disk drive when power is applied to the one or more of the separate computers. When the switch (310) in a separate computer is set to connect the host disk drive adapter (312) to the external RAID controller (302), a virtual drive presented by the external RAID controller appears to the separate computer to be an internal disk drive within the separate computer.

The method of FIG. 4 also includes booting (334), by the one or more of the separate computers from the virtual disk drive, when power is applied to the one or more of the separate computers. The boot process includes the separate computer's usual power-on-self-test ('POST') functions, carried out using the virtual drive presented by the external RAID controller (302) and therefore the RAID array (336) as if it were an internal hard disk drive in the separate computer.

Exemplary embodiments of the present invention are described largely in the context of a fully functional computer system for implementing a RAID array. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of implementing a redundant array of inexpensive drives ('RAID'), the method implemented with an external RAID controller and with hard disk drives from separate computers, the method comprising:
   configuring by the external RAID controller a RAID array, the RAID array comprising hard disk drives from the separate computers, the external RAID controller comprising a hardware RAID controller installed externally with respect to the separate computers; and
   storing, by one or more of the separate computers through the external RAID controller, computer data on the RAID array.

2. The method of claim 1 wherein at least one of the separate computers comprises a switch having two switch states, the switch states comprising:
   a first switch state in which the switch connects a host disk drive adapter in the at least one separate computer through the switch only to the hard disk drive in the at least one separate computer; and
   a second switch state in which the switch connects the host disk drive adapter in the separate computer through the switch only to the external RAID controller.

3. The method of claim 1 wherein the host disk drive adapter is a Serial Attached Small Computer System Interface ('SAS') adapter and the switch is an SAS switch.

4. The method of claim 1 wherein the separate computers comprise blade servers.

5. The method of claim 1 wherein at least one of the separate computers comprises a switch having two switch states, the switch states comprising:
   a first switch state in which the switch connects a host disk drive adapter in the at least one separate computer through the switch only to the hard disk drive in the at least one separate computer; and
   a second switch state in which the switch connects the host disk drive adapter in the separate computer through the switch only to the external RAID controller;
   wherein the at least one separate computer, except for the its disk drive adapter, hard disk drive, and switch, is included in a first power domain, and the its host disk drive adapter, hard disk drive, and switch are included in a second power domain.

6. The method of claim 1 further comprising:
   discovering by the RAID controller hard disk drives in the separate computers that are available for use in a RAID array;
   presenting the RAID array to the one or more of the separate computers as a virtual disk drive;
   discovering, by the one or more of the separate computers, the presence of the virtual disk drive when power is applied to the one or more of the separate computers; and booting, by the one or more of the separate computers from the virtual disk drive, when power is applied to the one or more of the separate computers.

7. Apparatus for implementing a RAID array, the apparatus comprising an external RAID controller and hard disk drives from separate computers, the apparatus further comprising a computer processor, a computer memory operatively coupled to the computer processor, the computer memory having disposed within it computer program instructions capable of:

configuring by the external RAID controller a RAID array, the RAID array comprising hard disk drives from the separate computers, the external RAID controller comprising a hardware RAID controller installed externally with respect to the separate computers; and storing, by one or more of the separate computers through the external RAID controller, computer data on the RAID array.

8. The apparatus of claim 7 wherein at least one of the separate computers comprises a switch having two switch states, the switch states comprising:

a first switch state in which the switch connects a host disk drive adapter in the at least one separate computer through the switch only to the hard disk drive in the at least one separate computer; and a second switch state in which the switch connects the host disk drive adapter in the separate computer through the switch only to the external RAID controller.

9. The apparatus of claim 7 wherein the host disk drive adapter is a Serial Attached Small Computer System Interface ('SAS') adapter and the switch is an SAS switch.

10. The apparatus of claim 7 wherein the separate computers comprise blade servers.

11. The apparatus of claim 7 wherein at least one of the separate computers comprises a switch having two switch states, the switch states comprising:

a first switch state in which the switch connects a host disk drive adapter in the at least one separate computer through the switch only to the hard disk drive in the at least one separate computer; and a second switch state in which the switch connects the host disk drive adapter in the separate computer through the switch only to the external RAID controller;

wherein the at least one separate computer, except for the its disk drive adapter, hard disk drive, and switch, is included in a first power domain, and the its host disk drive adapter, hard disk drive, and switch are included in a second power domain.

12. The apparatus of claim 7 further comprising computer program instructions capable of:

discovering by the RAID controller hard disk drives in the separate computers that are available for use in a RAID array;

presenting the RAID array to the one or more of the separate computers as a virtual disk drive;

discovering, by the one or more of the separate computers, the presence of the virtual disk drive when power is applied to the one or more of the separate computers; and booting, by the one or more of the separate computers from the virtual disk drive, when power is applied to the one or more of the separate computers.

13. A computer program product for implementing a RAID array, the RAID array implemented with an external RAID controller and hard disk drives from separate computers, the computer program product disposed upon a computer readable, recordable medium, the computer program product comprising computer program instructions capable of:

configuring by the external RAID controller a RAID array, the RAID array comprising hard disk drives from the separate computers, the external RAID controller comprising a hardware RAID controller installed externally with respect to the separate computers; and storing, by one or more of the separate computers through the external RAID controller, computer data on the RAID array.

14. The computer program product of claim 13 wherein at least one of the separate computers comprises a switch having two switch states, the switch states comprising:

a first switch state in which the switch connects a host disk drive adapter in the at least one separate computer through the switch only to the hard disk drive in the at least one separate computer; and a second switch state in which the switch connects the host disk drive adapter in the separate computer through the switch only to the external RAID controller.

15. The computer program product of claim 13 wherein the host disk drive adapter is a Serial Attached Small Computer System Interface ('SAS') adapter and the switch is an SAS switch.

16. The computer program product of claim 13 wherein the separate computers comprise blade servers.

17. The computer program product of claim 13 wherein at least one of the separate computers comprises a switch having two switch states, the switch states comprising:

a first switch state in which the switch connects a host disk drive adapter in the at least one separate computer through the switch only to the hard disk drive in the at least one separate computer; and a second switch state in which the switch connects the host disk drive adapter in the separate computer through the switch only to the external RAID controller;

wherein the at least one separate computer, except for the its disk drive adapter, hard disk drive, and switch, is included in a first power domain, and the its host disk drive adapter, hard disk drive, and switch are included in a second power domain.

18. The computer program product of claim 13 further comprising computer program instructions capable of:

discovering by the RAID controller hard disk drives in the separate computers that are available for use in a RAID array;

presenting the RAID array to the one or more of the separate computers as a virtual disk drive;

discovering, by the one or more of the separate computers, the presence of the virtual disk drive when power is applied to the one or more of the separate computers; and booting, by the one or more of the separate computers from the virtual disk drive, when power is applied to the one or more of the separate computers.

* * * * *